United States Patent
Vatani et al.

(10) Patent No.: US 12,005,640 B2
(45) Date of Patent: *Jun. 11, 2024

(54) METHOD AND SYSTEM OF USING GRADUAL DRYING IN MULTI-MATERIAL 3D PRINTING

(71) Applicant: Sakuu Corporation, San Jose, CA (US)

(72) Inventors: Morteza Vatani, Los Gatos, CA (US); Philip Eugene Rogren, Half Moon Bay, CA (US)

(73) Assignee: Sakuu Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,934

(22) Filed: Jun. 3, 2022

(65) Prior Publication Data

US 2023/0390998 A1      Dec. 7, 2023

(51) Int. Cl.
| | |
|---|---|
| *B29C 64/165* | (2017.01) |
| *B29C 64/223* | (2017.01) |
| *B33Y 10/00* | (2015.01) |
| *B33Y 30/00* | (2015.01) |
| *B33Y 40/10* | (2020.01) |
| *B33Y 40/20* | (2020.01) |

(52) U.S. Cl.
CPC .......... *B29C 64/165* (2017.08); *B29C 64/223* (2017.08); *B33Y 10/00* (2014.12); *B33Y 30/00* (2014.12); *B33Y 40/10* (2020.01); *B33Y 40/20* (2020.01)

(58) Field of Classification Search
CPC ......... B22F 10/00–85; B22F 12/00–90; B29C 64/112; B29C 64/165; B29C 64/147; B32B 37/00–30
See application file for complete search history.

(56) References Cited

U.S. PATENT DOCUMENTS

| | | | |
|---|---|---|---|
| 6,363,606 B1 | 4/2002 | Johnson, Jr. et al. | |
| 7,419,257 B2 | 9/2008 | Mouri et al. | |
| 8,337,953 B2* | 12/2012 | Nakazawa | B41J 11/00216 427/407.1 |
| 8,879,957 B2* | 11/2014 | Hanson | B33Y 10/00 399/130 |
| 9,482,974 B2 | 11/2016 | Martin | |
| 10,272,664 B2 | 4/2019 | Hays et al. | |
| 11,260,581 B2* | 3/2022 | Rogren | B29C 64/188 |
| 11,273,608 B2 | 3/2022 | Rogren et al. | |
| 2004/0119208 A1* | 6/2004 | Gray | A61F 13/513 264/156 |

(Continued)

*Primary Examiner* — Philip C Tucker
*Assistant Examiner* — Andrew L Swanson (57) ABSTRACT

A three-dimensional (3D) printer includes a receiver device, a plurality of material deposition units for depositing a material including a particulate material and a liquid vehicle onto the receiver device to form a printed layer on the receiver device, and a material removing system that includes a plurality of extraction units for gradually removing the liquid vehicle from the printed layer. A delivery system of the 3D printer may transport the printed layer from the receiver device to a build platform for stacking a plurality of printed layers and a plurality of post-deposition processing stations may be positioned along the delivery system for performing post-deposition operations on the printed layer.

15 Claims, 6 Drawing Sheets

(56) References Cited

U.S. PATENT DOCUMENTS

| | | | |
|---|---|---|---|
| 2005/0056956 A1* | 3/2005 | Zhao | D04H 18/04 |
| | | | 264/180 |
| 2015/0024169 A1* | 1/2015 | Martin | B29C 64/141 |
| | | | 264/460 |
| 2015/0165739 A1* | 6/2015 | Taniuchi | B41J 11/0015 |
| | | | 118/308 |
| 2017/0050379 A1 | 2/2017 | Houben et al. | |
| 2017/0348908 A1* | 12/2017 | Liu | B22F 12/67 |
| 2018/0294412 A1 | 10/2018 | Cui | |
| 2019/0375159 A1* | 12/2019 | Rogren | B22F 12/88 |
| 2020/0171752 A1 | 6/2020 | Rogren | |
| 2020/0338815 A1* | 10/2020 | Batchelder | B29C 64/218 |

\* cited by examiner

METHOD AND SYSTEM OF USING GRADUAL DRYING IN MULTI-MATERIAL 3D PRINTING

TECHNICAL FIELD

This application relates to multi-material three-dimensional (3D) printing using material jetting, and in particular to the use of a gradual drying process in a 3D printing system to increase the speed of printing of 3D objects, reduce shrinkage and/or reduce distortion of printed layers.

BACKGROUND 3D printing has generated a high degree of interest in the potential for a faster and more economical manufacturing approach since the first patents were granted over 30 years ago. To date, however, that potential has largely gone unfulfilled. Today, the majority of 3D printers are used to make demonstration parts or nonfunctional prototypes, most from a plastic material that is chosen primarily for compatibility with the printer rather than the materials requirement of the final part.

One of the reasons 3D printing has not gained mainstream use is the amount of time required to finish printing an object. Inkjet 3D printing can increase the printing speed. However, while rapidly depositing large areas of ink, inkjet 3D printing can still require a significant amount of time due to the time required for solvent evaporation. Another challenge with material jetting in inkjet printing is the low resolution and shrinkage of individual layers due to solvent evaporation and shrinkage because of polymerization. This shrinkage limits the printing size and height in material jetting.

Thus, a need remains for a 3D printing system that can preserve the fine resolution of inkjet technology while substantially improving speed of printing and/or reducing shrinkage.

SUMMARY

In one general aspect, the instant disclosure describes a three-dimensional (3D) printer that includes a receiver device; a plurality of material deposition units, each material deposition unit configured to deposit a material onto the receiver device, the plurality of material deposition units configured to form a printed layer on the receiver device and the material including a particulate material and a liquid vehicle; a material removing system, the material removal system including a plurality of extraction units for gradually removing the liquid vehicle from the printed layer; and a delivery system for transporting the printed layer from the receiver device to a build platform.

The above general aspect may include one or more of the following features. For example, the 3D printer includes a plurality of curing stations for gradually curing the printed layer, a plurality of post-deposition processing stations positioned along the delivery system for performing post-deposition operations on the printed layer, and the build platform configured for stacking a plurality of printed layers. In another example, the plurality of post-deposition processing stations includes at least one of one or more conditioning units, one or more calendaring units and one or more curing units.

For another example, the plurality of extraction units are positioned in a plurality of locations along the delivery system, each of the plurality of extraction units being configured to remove a portion of the liquid vehicle from the deposited material. In another example, the plurality of extraction units include an initial extraction unit and one or more additional extraction units, the plurality or extraction units having varying liquid extraction abilities. In one example, the initial extraction unit applies at least one of a heat source or a vacuum to remove the liquid vehicle and the additional extraction units also apply at least one of a heat source or a vacuum to remove the liquid vehicle. In another example, at least one of the additional extraction units applies heat to the printed layer to melt a binder in the printed layer.

In a further example, the material removal system includes one or more drums configured to apply a pressure differential to extract the liquid vehicle. The drums may be porous drums having low surface tension. In yet another example, the receiver device is a printing drum; the delivery system includes one or more intermediate drums and a carrier; and the one or more intermediate drums are configured to transfer the printed layer from the receiver device to the carrier. In one example, the one or more intermediate drums are configured to gradually remove the liquid vehicle from the printed layer by applying a pressure differential on the printed layer. In another example, the carrier is configured to transport the printed layer from the one or more intermediate drums to the build platform.

In another general aspect, the instant disclosure describes a method of 3D printing, the method including depositing a material onto a receiver device, via a plurality of material deposition units, to form a printed layer on the receiver device, the printed layer including a particulate material and a liquid vehicle; gradually removing at least a portion of the liquid vehicle from the printed layer via a material removing unit comprising a plurality of extraction units; and transferring, via a delivery system, the printed layer from the receiver device to a build platform configured for stacking a plurality of printed layers.

The above general aspect may include one or more of the following features. For example, the method further includes moving the printed layer through a plurality of post-deposition processing stations for post-processing the printed layer. In another example, gradually removing at least a portion of the liquid vehicle from the printed layer includes applying a pressure differential via one or more drums to the printed layer to remove at least some of the liquid vehicle. In an additional example, the one or more drums transfer the printed layer from the receiver device to a carrier device, the carrier device being a part of the delivery system for transferring the printed layer to the build platform.

In a further example, gradually removing at least a portion of the liquid vehicle from the printed layer includes applying heat to the printed layer to remove some of the liquid vehicle. In another example, gradually removing at least a portion of the liquid vehicle from the printed layer includes applying a vacuum to the printed layer to remove some of the liquid vehicle. In yet another example, the plurality of post-deposition processing stations includes at least one of one or more conditioning units, one or more calendaring units and one or more curing units. In one additional example, gradually removing at least a portion of the liquid vehicles includes using extraction units of varying solvent extraction abilities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Additional advantages and novel features of these various general aspects will be set forth in part in the description that follows, and in part will become more apparent to those skilled in the art upon examination of the following or upon learning by practice of the invention.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Inkjet printheads work most effectively with low-viscosity ink, for example ink with a viscosity of no more than about 40 centipoise (cP), which can dictate a very low loading of insoluble materials such as metals, ceramics or polymers. Typically, the volumetric loading of insoluble materials in inkjet ink is 20% or less. Binders may also make up 5% to 20% of the total volume of the ink, leaving 60% to 75% or more as liquid vehicle, much of which must be removed in order to achieve a practical green density of at least 40% by volume of the insoluble materials.

Jetted material printers can be used with inks that include materials that may be polymerized to a solid mass after deposition, an approach that is useful for making parts built largely of organic materials. While it may be theoretically possible to formulate a virtually 100% polymerizable material that may be jetted, it is unlikely that inks comprising dispersion of insoluble materials will ever exceed around 20% by volume of the insoluble material. Therefore, if jetted material printers are to be practical for high-speed 3D printing, it would be advantageous for them to be provided with a means of removing the majority of the liquid vehicle deposited during the printing cycle much more rapidly. Implementations discussed herein increase the speed of construction of a printed object by gradually drying the printed layers using a plurality of liquid removal devices and/or curing stations.

The 3D inkjet printers described herein are designed to create printed objects, printed layers and printed parts using combinations of materials not typically associated with inkjet printing. These materials may be high performance engineering materials designed specifically to meet the engineering requirements of the final printed part, incorporated in inks specifically designed for use in inkjet printheads. These materials may include ceramic and metals as well as organic materials that may be included as particles suspended in a liquid vehicle. In an example, jetted materials include a powder, a binder, and an additive. In another example, the jetted material includes a ceramic powder, a metallic powder, a polymeric powder, a binder, and/or a solvent.

The technical solutions described herein relate to a 3D printing system which may include a plurality of inkjet printheads to deposit one or more layers on a substrate, and multiple evaporation stations to gradually dry the layers to increase the printing speed. In various implementations, the 3D printing system may include multiple curing stations, and a carrier system to transfer the cured layers to a build platform. Various units of the printing system may be directed by a central computer system to coordinate the operations of the units as necessary and deposit the proper material at the required precision while maximizing the overall printing speed. Thus, the 3D printing system may include a plurality of material printheads, where each of the printheads is chosen for its ability to deposit a specific material or group of materials at the precision required for the target application. The printed layers may then be transferred to multiple solvent extraction and curing stations to decouple the material jetting from solvent extraction, and curing steps, thereby increasing the drying speed, reducing shrinkage and/or reducing the chances of distortion of printed layers. The dried, and optionally cured, layers may then be transferred into the conditioning and calendaring stations and then delivered to the build platform.

A basic process for manufacturing a 3D printed part typically begins with a CAD file fully defining the structure, materials and specifications of the desired part. The part described in the CAD file may be sliced into print pattern layers, the thickness of each layer may be determined by specifications for each position within the printed part, such as final thickness and pattern tolerance. Each layer may then be separated into regions, which may require different materials. Printer control instructions for each of the regions of different material requirement may then be transferred from the design file via input device and central processing unit and interface bus to appropriate print station control units of the jetted material printing system.

As used herein, a "printed part" includes any assemblage of printed subparts or layers which may be fused together to form the part. Such an assemblage may be referred to as a "printed part" before or after fusing together its constituent parts. As used herein, a "printed layer" includes a layer of one or more materials, one voxel thick, which may have a horizontal design conforming to a design of a predetermined location within a desired printed part.

Figure 1:
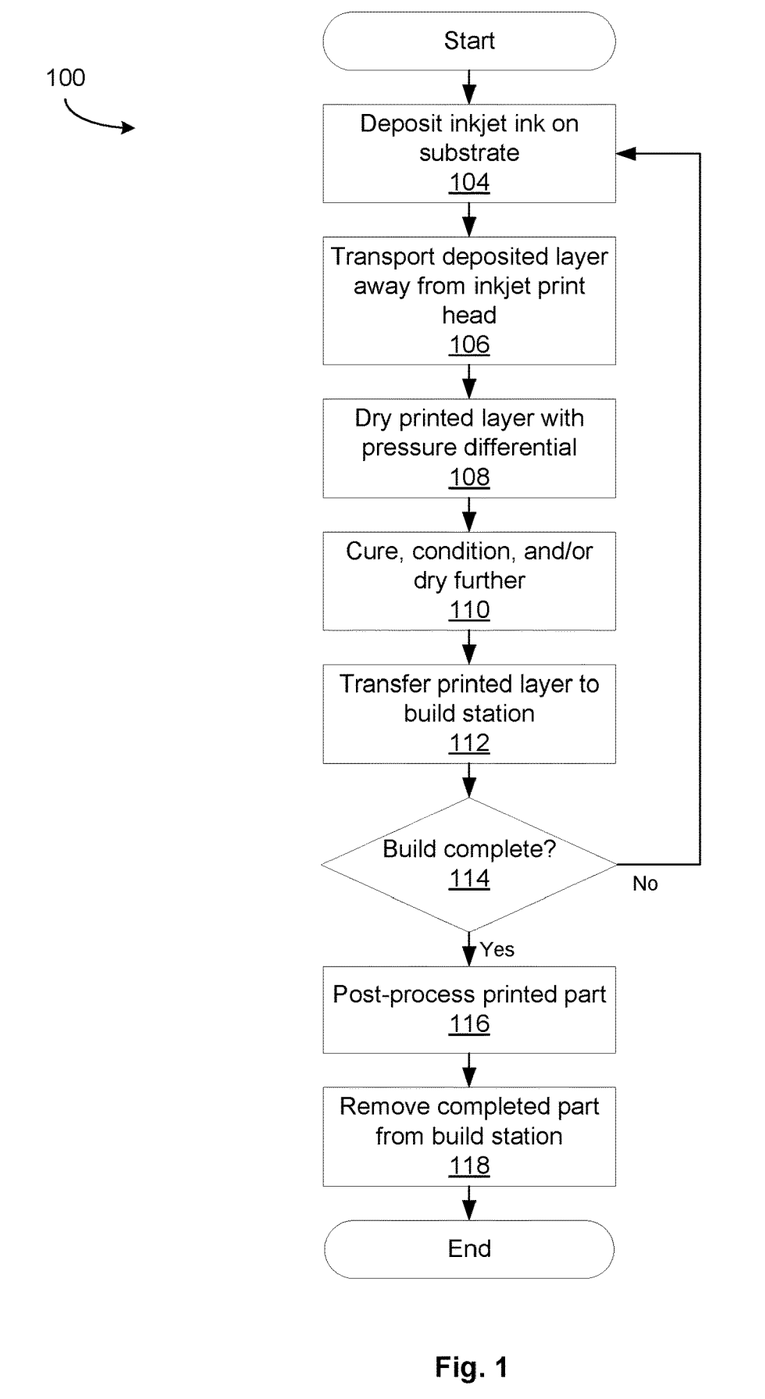
FIG. 1 depicts a method for creating a 3D printed part using inkjet printing at a highly abstracted level.

FIG. 1 depicts a method 100 of creating a 3D printed part at a highly abstracted level. Details of each step of the depicted method will be expanded as subsequent figures are described below. The method 100 begins by depositing inkjet ink onto a substrate (step 104) in a patterned layer using an inkjet printhead, as further described below. The deposited patterned layer is then transported away from the inkjet printhead (step 106), and a pressure differential is applied by multiple drying stations in order to gradually dry the printed layer (step 108). Applying pressure differential by multiple drying stations results in reduced shrinkage and an overall increase in printing speed. Optionally, the printed layer may also be conditioned, cured, and/or further dried (step 110). Once processing steps for the single printed layer are complete, the printed layer is transported to a build station, where it is transferred to a stack of previously printed layers (or, for the first layer printed, begins a new stack on the build station) (step 112). This process is repeated until all layers of the desired printed part have been transferred to the build station (conditional step 114). For some implementations, after all of the layers have been stacked at the build station, postprocessing on the printed part may be completed (step 116), for example by applying heat or another energy input in order to cure or solidify the stacked layers. Finally, the completed printed part may be removed from the build station (step 118). In some implementations, the printed layer is printed on the build station and moved through the various processing stations until it is ready for stacking. At that point, the build station may be transported back to the inkjet jetting station where the next layer is printed on top of the previous printed layer.

Figure 2:
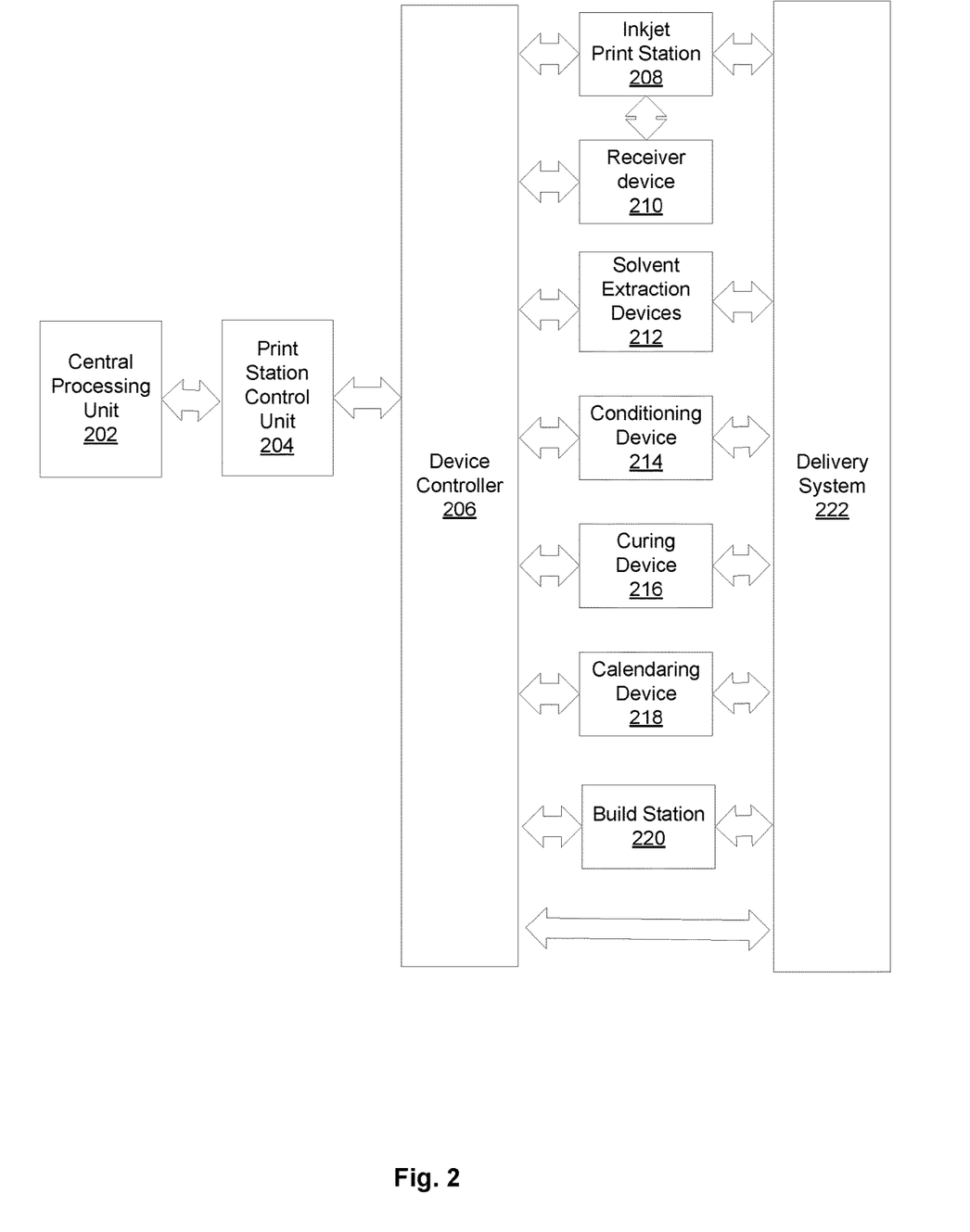
FIG. 2 depicts a schematic of interactions between various elements of a 3D inkjet printing system, according to some implementations.

FIG. 2. depicts a schematic of interactions between various elements of a 3D inkjet printing system. In some implementations, a receiver device 210 is in communication with inkjet print stations 208 for receiving material deposits. The material deposits may form a printed layer on a substrate of the receiver device 210. A transfer mechanism such as the delivery system 222 may then be used to transport the printed layer (or the receiver device 210) to multiple solvent extraction devices 212, conditioning device 214, curing device 216, and calendaring device 218 for various processing steps to be performed on the printed layer. Once processing of the printed layer is complete, the printed layer may be transported to a build station 220 for stacking with previously printed layers or to be prepared for receiving additional printed layer if the printed layer is the first layer. The solvent extraction devices 212 may enable gradual drying of the printed layers, and decouple the solvent extraction process from the deposition process, thereby increasing printing speed.

A print station control unit 204 may communicate via a device controller 206 with the inkjet print station 208, receiver device 210, solvent extraction devices 212, conditioning device 214, curing device 216, calendaring device 218 (which may include an X-Y positioner), delivery system 222 and build station 220, controlling each of these devices in order to deposit ink as specified by a design file as interpreted by the central processing unit (CPU) 202. CPU 202 may receive state information and sensor information, and may send control signals, to any of these devices using control signaling systems that are known in the art, in order to facilitate printing as described herein.

Figure 3:
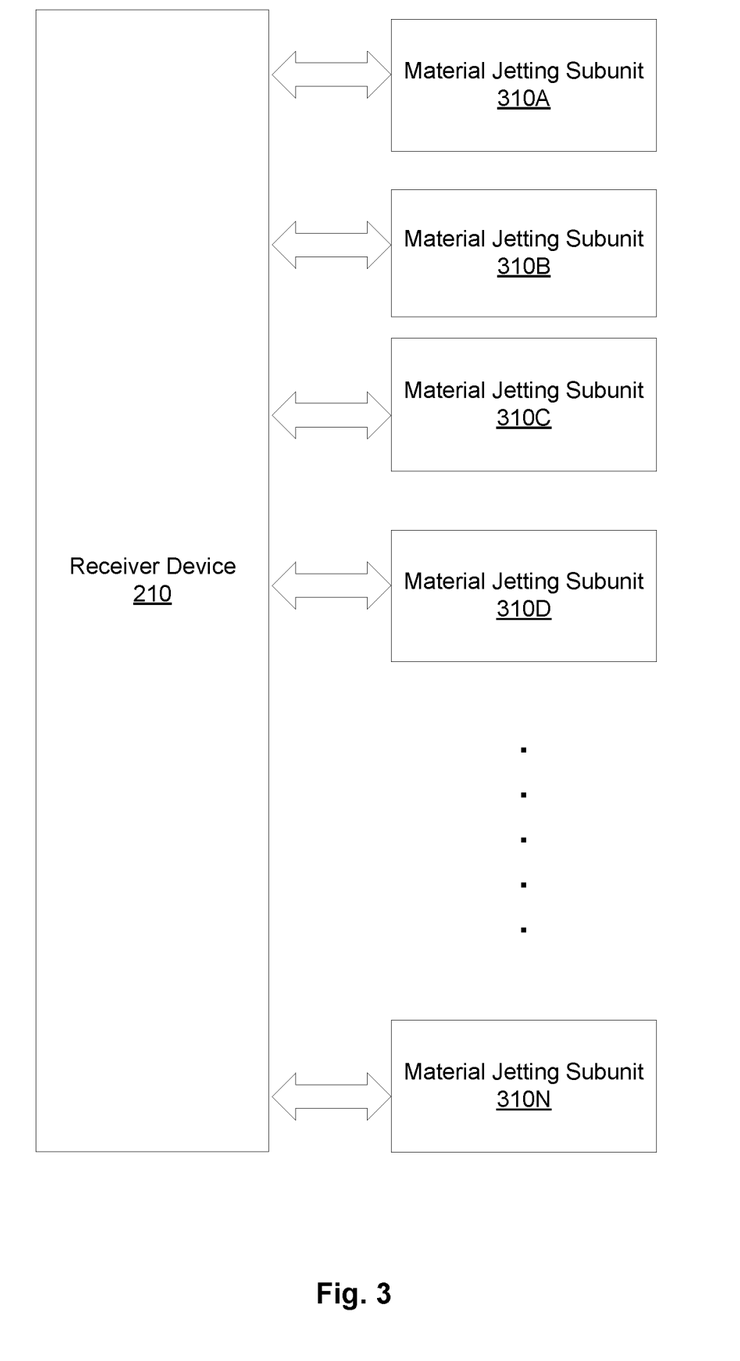
FIG. 3 depicts interactions between multiple material jetting subunits and a receiver device in a 3D inkjet printing system, according to some implementations.
Figure 6:
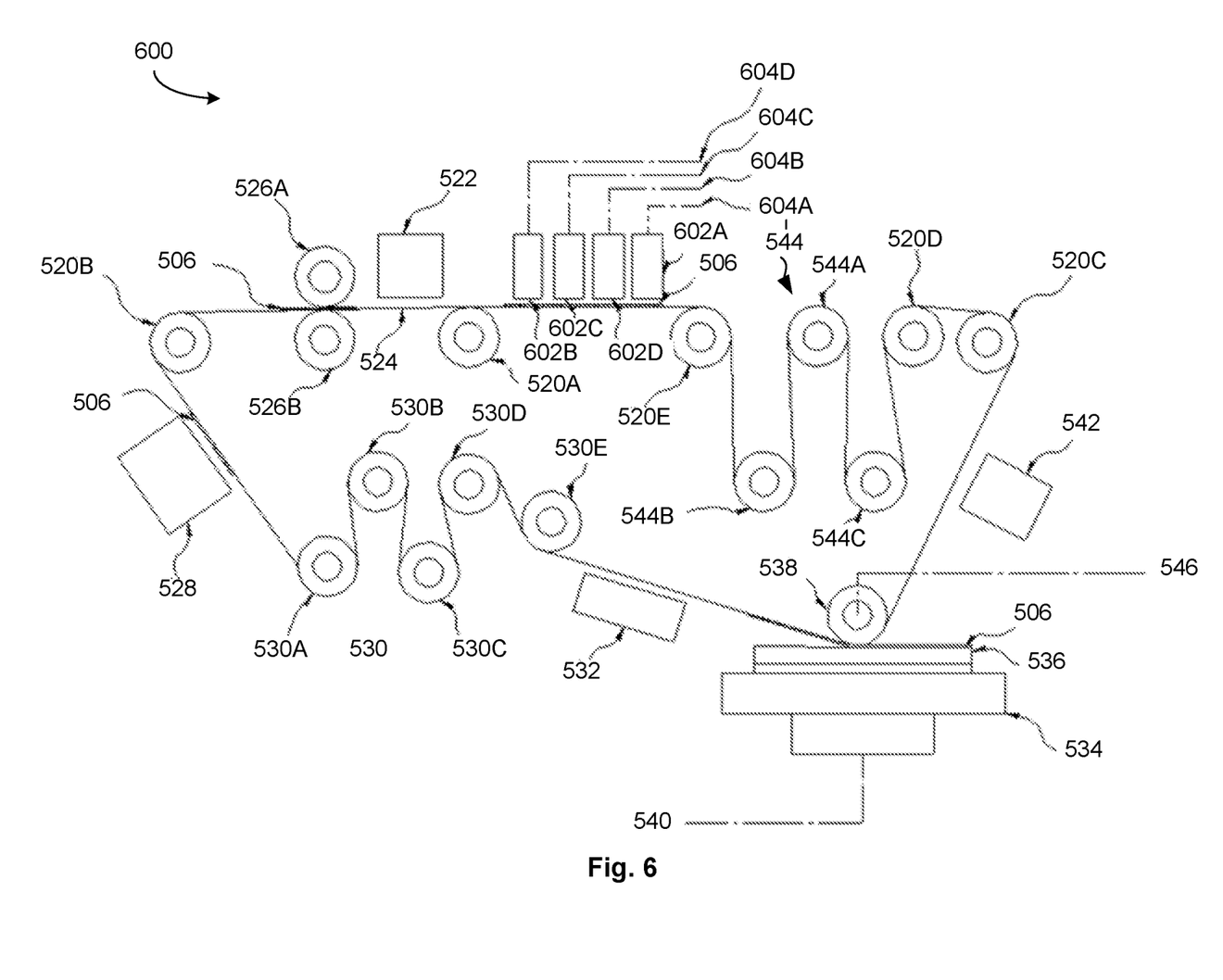
FIG. 6 depicts another example continuous 3D printing system.

In some implementations, an inkjet print station such as the inkjet print station 208 includes one or more material jetting subunits. FIG. 3 depicts interactions between multiple material jetting subunits and a receiver device. As depicted, a print station may include multiple material jetting subunits 310A, 310B, 310C, 310C, 310D to 310N. Each of these material jetting subunits may deposit a material on the receiver device 210 to form a printed layer. Each material subunit may include one or more printheads to increase the printing speed. Moreover, each printhead may have one or more printing nozzles. Each printhead may print one material. As a result, the combination of multiple inkjet printheads may print one, two, three, four, or more materials in a single layer. The printheads may be installed and arranged in several different ways to increase the resolution and printing speed. In some implementations, a printhead includes an array of stacked inkjet printheads. The printheads may be installed stationary around an intermediate rotational drum, or they can be installed on X-Y moving stages, as illustrated in FIG. 6, and described further below.

Figure 4:
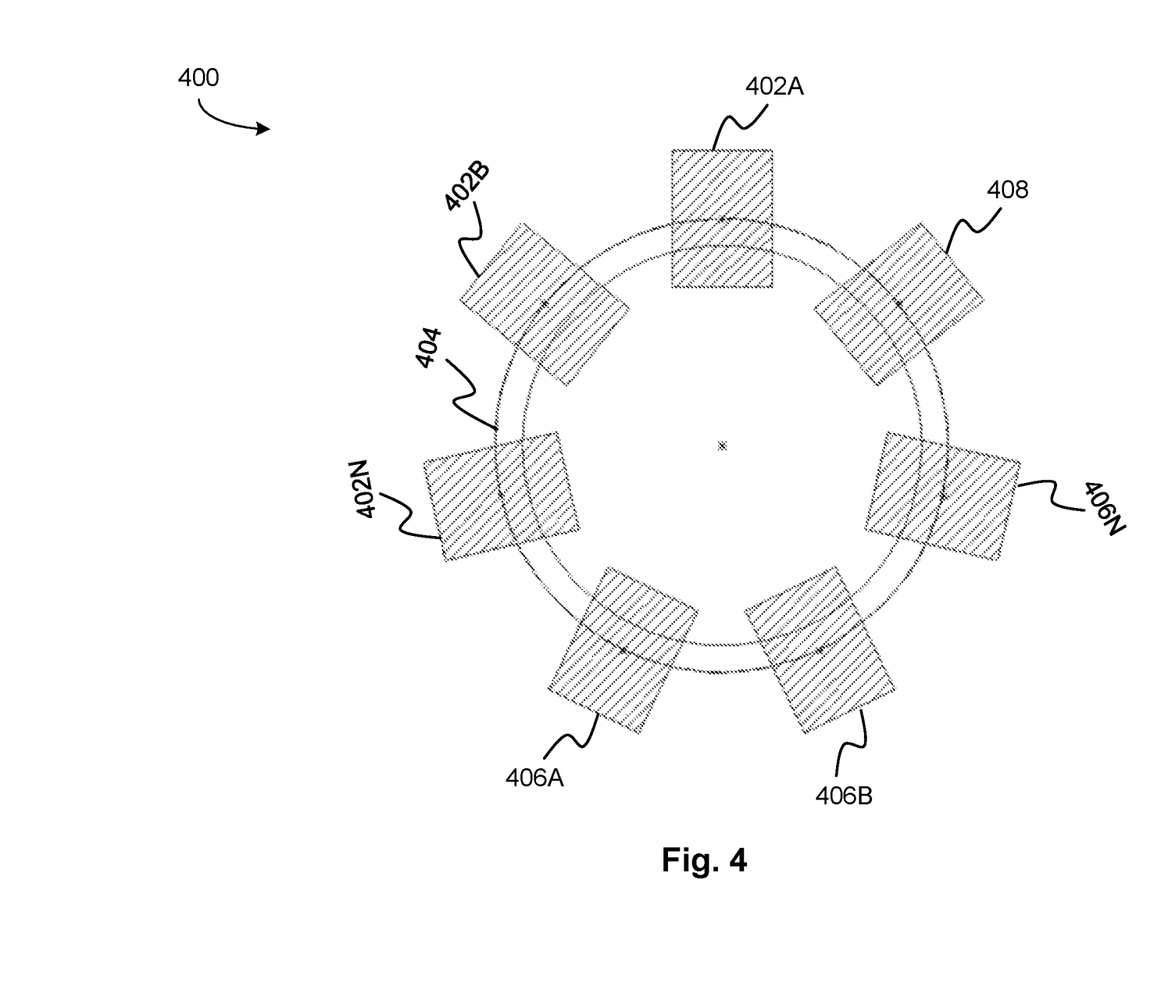
FIG. 4 depicts a top view of one implementation of a continuous 3D printing system.

FIG. 4 depicts a top view of one implementation of a continuous 3D printing system 400. In some implementations, the system 400 may include multiple platforms (not shown) that are movable via a delivery system 404, as further discussed below. Deposition of the patterned layer (step 104 of FIG. 1) may start in the system 400 by depositing inkjet inks via one or more inkjet printheads of the print stations 402A-402N onto a receiver device (e.g., receiver device 210 of FIG. 2, not shown in FIG. 4). The receiver device 210 may take many forms, such as individual carrier plates or an extended length of carrier material that may be cycled through the printer one time before being reconditioned or disposed of. In some implementations, the receiver device of the system 400 is the same as the build platform, as further discussed below. The system 400 may include a plurality of receiver devices (e.g., the same number of receiver devices as the print stations).

Each receiver device may be movable via the delivery system 404 such that it can be positioned below an appropriate station at each stage of the printing process. For example, a first receiver device may be first positioned underneath print station 402A while a first printed layer is deposited on the receiver device. Once the deposition of the first printed layer is complete, the first receiver device may be transferred under the first solvent extraction unit 406A for extracting the solvent from the printed layer. In an example, the receiver device 210 is a rotary moving platform.

The system 400 may include multiple solvent extraction units 406A-406N that are placed in multiple locations along the delivery system to gradually extract the solvents from the printed layers. The solvent extraction source can be a vacuum, heat source, infrared or high-pressure airflow, or a combination of these systems. In some implementations, the first receiver device may be transferred from the first solvent extraction unit 406A to the next solvent extraction unit 406B for gradual removal of solvents. By separating the solvent extraction from the printing and stacking steps, the system 400 increases the building rate significantly.

Once the solvent is extracted from the printed layer, the first receiver device may be transferred via the delivery system 404 to one or more conditioning devices (e.g., conditioning device 214 of FIG. 2, not shown in FIG. 4) for heating and softening the binder of the printed layer. After softening the binder, the printed layer can be compacted or released from the carrier of the delivery system. In some implementations, the system 400 may include multiple conditioning devices such that multiple printed layers on the receiver devices can be processed simultaneously.

After solvent extraction and/or conditioning has been completed for a printed layer, the receiver device may be transferred by the delivery system 404 to one or more curing devices (e.g., curing device 216 of FIG. 2, not shown in FIG. 4). Similar to the solvent extraction units, the system 400 may include a plurality of curing devices. Curing devices may be positioned downstream from the conditioning devices and/or downstream from solvent extraction units along the direction of travel. Curing devices may be configured to solidify binding material in the ink, thereby fixing the ink into a functionally robust solid pattern. Curing devices may include a source of radiant energy that may interact with the binding material to cause it to become solid. In some implementations, the radiant energy can be IR radiation, UV radiation, electron beam, or other known radiation types. Alternatively, or in addition, curing devices may include a heat source. It should be understood that the curing devices do not need to be limited to the disclosed radiation types, as this list is presented for exemplary implementations and not intended to be exhaustive. In addition to curing devices, system 400 may also include one or multiple calendaring and pressing stations (e.g., calendaring device 218 of FIG. 2, not shown in FIG. 4) to increase the material packing density in the printed layers and to control the layer thickness.

In some implementations, once a printed layer on a receiver device has been processed by each of the multiple processing devices (e.g., solvent extraction, conditioning, curing, calendaring, etc.), the delivery system 404 may position the receiver device adjacent to (e.g., underneath or above) a transferring station (not shown in FIG. 4) that removes the printed layer from the receiver devices and moves the printed layer to a build station (e.g., build station 220 of FIG. 2, not shown in FIG. 4) for stacking. In other implementations, the stacking process may be performed on the receiving devices themselves. This may be achieved by transferring the receiving device containing the processed printed layer back to the one of the printing stations 402A-402N for printing the next layer and continuing with the post-printing processing steps until a printed object is created. In some implementations, the system 400 includes a buffer station 408 located downstream from the plurality of post-print processing stations. The buffer station 408 may help with synchronization of system components such as printheads, solvent extraction units, curing stations, calendaring stations, building stations and the like.

The delivery system 404 may transfer the printed layer from material jetting to the solvent extraction station, before moving the dried printed layer to the conditioning stations, and from there to the curing stations, calendaring stations and then to the transferring station. From the transferring station, the printed layer may be transferred via the delivery system 404 to a building station for stacking. The delivery system 404 of system 400 may be a continuous movable belt that transfers the receiver device to the various stations. In an example, the delivery system 404 is a rotating system (e.g., belt) such as a closed-loop configuration rotating system. In some implementations, the delivery system 404 is a smart conveyer system.

Figure 5:
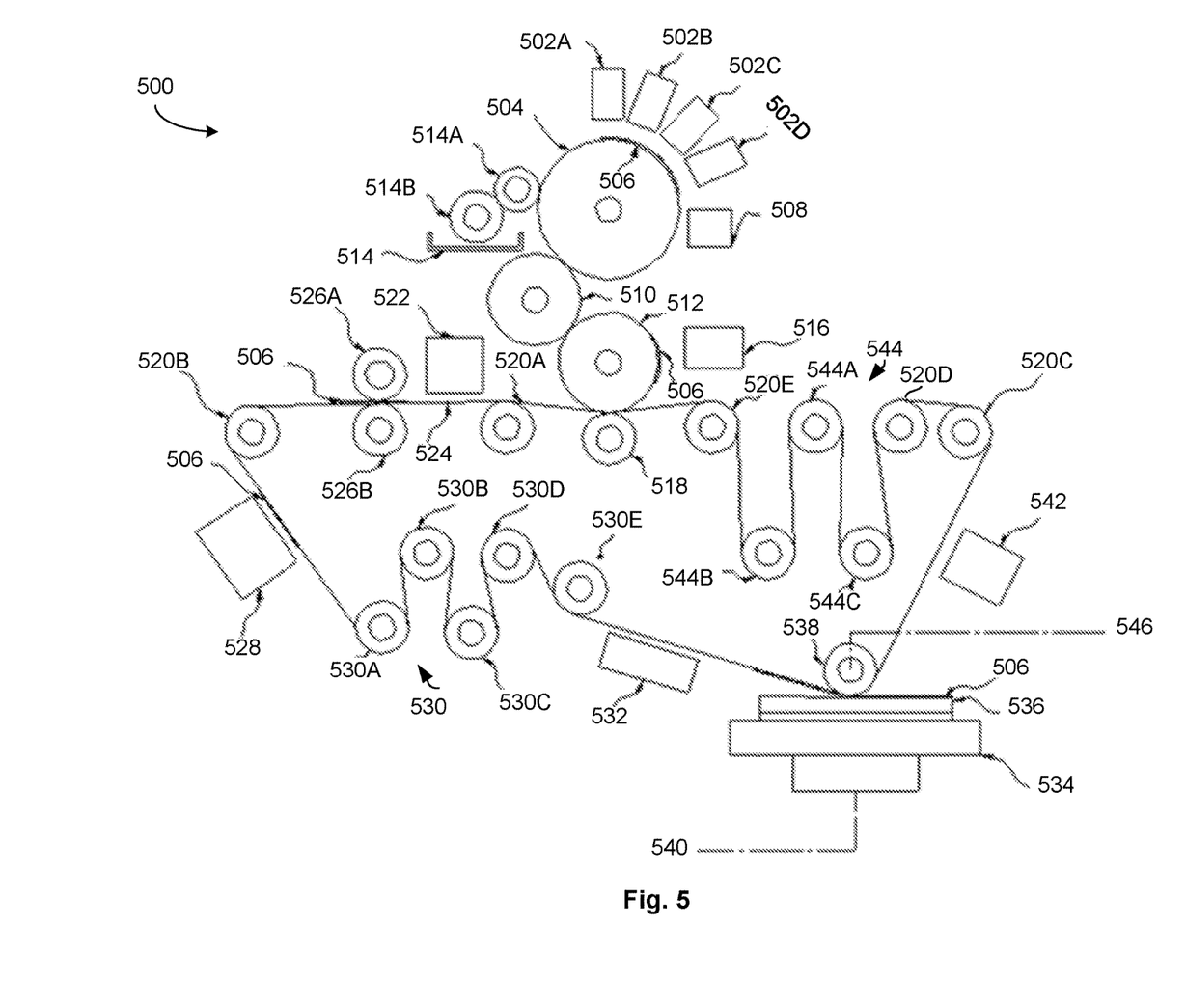
FIG. 5 depicts an example continuous 3D printing system having stationary printheads.

FIG. 5 depicts an example 3D printing system 500 having stationary printheads. The 3D printing system 500 may include a plurality of stationary printheads 502A-502D that are positioned around a receiver device 504. The receiver device 504 may be configured as a rotational drum. Utilizing a rotational configuration with stationary printheads may lead to an increase in the printing speed (e.g., compared to configurations where printheads move in the XY directions). Moreover, such a configuration may increase the mechanical stability of the system 500.

The stationary printheads 502A-502D may be inkjet printheads and each one of the plurality of inkjet printheads 502A-502D may deposit ink in a predetermined pattern of a printed layer according to instructions received from a control system in communication with a computer. The printheads 502A-502D may be arranged and positioned along the rotational receiving device 504 to print the printed layer while the receiving device 504 is rotating. The deposited inks form printed layer 506 atop receiver device 504. Each of the plurality of inkjet material printheads 502A-502D may be supplied with inkjet ink containing a same or different material, each material conforming to a predetermined physical specification. Each of the plurality of inkjet printheads may be of the types known in the art, e.g., piezo heads, thermal heads, or valve-based heads. The plurality of printheads may all be of the same type, or each of the plurality of printheads may be of a type that is different from one or more of the other ones of the plurality of printheads. Printheads 502A-502D may be configured to print directly to the receiver device 504 in order to create a 3D printed layer thereon, or onto a permeable membrane placed on the receiver device 504. While four printheads are depicted in FIG. 5, the number of printheads may vary in different print systems. The material deposited by printheads 502A-502D may include a particulate material, a liquid vehicle comprising a solvent and a binder required for printing.

Each one of printheads 502A-502D may deposit a predetermined quantity of inkjet ink onto the receiver device 504 in a predetermined pattern of voxels, as directed by a print station controller. The predetermined pattern of voxels of each one of the plurality of printheads 502A-502D may be separated from all of the voxel patterns from any other ones of the plurality of printheads 502A-502D, or it may partially or completely overlap the voxel pattern of any other one or all of the rest of the plurality of printheads 502A-502D. The result may be a complete printed layer 506 of a predetermined pattern of a plurality of ink types on the receiver device 504. It will be understood that a "complete" pattern of ink may not cover 100% of the receiver device 504, depending on the part to be printed and any subsequent processing of the layer.

Receiver device 504 may include a permeable membrane (not shown), at least partially permeable to low viscosity liquids, for example liquids with viscosity less than about 2 cP, 4 cP, 6 cP, 8 cP, 10 cP, or 12 cP. The permeable membrane may include a metal, metal alloy, or other material that further includes an array of penetrating apertures that may communicate between two major surfaces of the permeable membrane. For convenience in the following description, the surface of membrane upon which ink is deposited will be referred to as the "top," and the opposite surface will be referred to as the "bottom," but it will be understood that receiver device 504 and permeable membrane may be oriented in any convenient direction.

Receiver device 504 may be configured to move the permeable membrane away from printheads 502A-502D after a printed layer 506 has been deposited thereon, for example through the action of a drive motor. In some implementations, receiver device 504 may be moved in a direction of travel such that printed layer 506 may be juxtaposed with a first extraction (and optionally curing) device 508. When printed layer 506 is moved away from printheads 502A-502D before drying, the process of deposition of ink is separated from the post-print processing steps to save time and increase the printing speed. Thus, system 500 separates inkjet deposition, post-deposition processing and stacking operations to increase the fabrication speed for a printed object.

In some implementations, the extraction (and optionally curing) device 508 includes heat source, vacuum capability and/or an air knife to generate hot airflow for a first stage of drying the printed layer 506 to enable transfer of the printed layer 506 to an intermediate drum 510, from which the printed layer 506 may be transferred to another drum 512. The extraction (and optionally curing) device 508 may dry the printed layer by being evacuated to cause low viscosity constituents of ink making up the printed layer 506 to be partially or completely removed, thereby drying the layer. Fluid pressure may also be applied in the extraction device 508 to assist liquid removal. Vacuum-assisted or pressure-assisted liquid extraction is described further in co-pending and commonly owned U.S. Pat. No. 11,260,581 which is incorporated by reference herein to the extent not inconsistent herewith.

The intermediate drums 510 and 512 may function as additional drying stations that enable a gradual process for the printed layer. The receiver device 504 and drums 510 and 512 may have low surface tension to prevent stickiness. Furthermore, the drums 510 and 512 may be porous drums, having the same, similar, gradual or varying porosity and/or solvent extraction abilities. The drums 510 and 512 may apply back pressure to release the printed layer 506 from the drums 510 and 512.

The use of the porous drums 510 and 512 together with the extraction device 508 generates a gradual solvent extraction mechanism which removes solvent faster than single solvent extraction mechanisms. That is because the combined time spent undergoing solvent removal via the extraction device 508 and drums 510 and 512 is less than the amount of time required for removing solvent and waiting a sufficient amount of time for a layer to be dry in a system that only uses one solvent extraction device. Furthermore, by gradually removing solvent via the use of multiple solvent extraction elements, system 500 reduces shrinkage and reduces the chances of printing material being extracted with solvent. That is because when solvent is extracted quickly, there is a higher chance that printing material will be extracted along with the solvent. Furthermore, gradual removal of solvent maximizes volume of material transferred. This increases the final density of the printed objects and results in improved efficiency which can increase throughput. Still further, gradual removal of solvent minimizes material spreading on transfer drums and as such can decrease distortion of the printed layer during transfer.

The 3D printing system 500 may include a cleaning station 514 for cleaning the receiver device 504. In some implementations, the cleaning station 514 may include a plurality of cleaning devices 514A-514B for applying a cleaning agent to the surface of the receiver device 504 for cleaning a previously printed layer. For example, after a printed layer has been removed from and before another layer is printed on the receiver device 504, the cleaning devices 514A-514B may apply a solvent to the surface of the receiver device 504 to clean it.

Once the printed layer 506 is transferred to the print drum 512, a heating station 516 may be used to apply heat to the printed layer 506 such that it may be released from the print drum 512 and transferred to carrier 524. A carrier 524 may function as a movable delivery system for transporting the printed layer 506 to various processing stations of the 3D printing system 500. The carrier 524 may be a movable belt. In some implementations a rolling device 518 is used to generate pressure against the drum 512 to enable transfer of the printed layer 506 from the print drum 512 to the carrier 524. The print drum 512 may also exert back pressure to release the printed layer 506. In this manner, solvent is extracted from the printed layers before the printed layers are transferred to the carrier 524. The gradual extraction of solvent from the printed layer 506 is carried out via devices such as the extraction device 508 and drums 510, 512 prior to the printed layer 506 being transferred to carrier 524 and undergoing further processing.

Rolling devices 520A-520E may be positioned in various locations along the path of travel of the carrier 524 to guide and control movement of the carrier 524. As the printed layer 506 moves along the carrier 524, a heating station 522 may be used to heat the printed layer 506 to soften and prepare it for compaction at the conditioning devices 526A-526B. The exact steps for conditioning a specific material may vary depending on the physical and chemical properties of the powder component of the ink and the target properties of the material after any post printing step. In some implementations, conditioning may include a compaction step, for example to increase the density of the printed layer to 30% to 70% of theoretical density. Compaction may also include a settling step such as a vibratory action applied to the layer to cause particles to settle and pack together. In another implementation, compaction may include pressing particles together with a force normal to the layer surface.

Conditioning devices 526A-526B may include a compaction device, such as the illustrated calender rolls, or alternatively another means of applying pressure such as a pressure cuff device (not shown). Conditioning devices 526A-526B may be configured to increase the compacted density of the materials of printed layer 506, for example to at least 30% of theoretical density. Conditioning devices 526A-526B may also include an apparatus to enhance or enable other processes to be carried out in later stages of the printing system, such as applying a coating to enhance the effectiveness of curing device 532 described below. Conditioning devices 526A-526B may also perform a surface conditioning action on the printed layer 506 to enhance the transfer of printed layer 506 to a stack of previously transferred layers or to enhance adhesion of successive layers. Conditioning devices 526A-526B may further include a heater device, which may in some implementations act to remove, for example evaporate, a remaining portion of liquid vehicle from the printed layer.

Conditioning may also include an action to improve the properties of printed layer 506 such as robustness or uniformity or the ability of printed layer 506 to adhere to build plate 534 or to the top of the stack of previously transferred layers 536. Conditioning may also include a step of reducing a packing density of particles of printed layer 506. Such actions may include heating or cooling printed layer 506. In a further implementation, the nature of conditioning devices 526A-526B may be selected to suit a conditioning requirement of printed layer 506. For example, conditioning devices 526A-526B may apply a radiation such a RF radiation, X-ray radiation, or ultraviolet radiation to effect a change in a property of a binder phase of unconditioned printed layer 506, thereby controlling the physical properties of the printed layer 506. Printed layer 506 may be further conditioned by changing the electrostatic state of printed layer 506 to improve the ability to transfer the printed layer 506 to build plate 534, or to the top of the stack of previously transferred layers 536. Such a change in electrostatic state may cause the adhesion of printed layer 506 to be modified such that when printed layer 506 is brought into contact with build plate 534, or to the top of the stack of previously transferred layers 536, the adhesion of printed layer 506 to carrier 524 is lower than the adhesion of printed layer 506 to build plate 534, or to the top of the stack of previously transferred layers 536. Thus, the transfer of printed layer 506 to build plate 534 or to the top of the stack of previously transferred layers 536 may be facilitated. By conditioning each printed layer before moving the printed layer 506 to the build plate 534, system 500 can minimize the shrinkage of each printed layer 506. In some implementations, shrinkage is reduced to less than 2%. This increases the final resolution of the 3D printed parts and reduce unwanted distortions.

Before or after of these steps, printed layer 506 may be moved to additional solvent extraction device 528, which may remove further liquid not extracted during previous steps. Solvent extraction device 528 may include a heating device or other liquid removal device such as the vacuum chamber to completely or partially remove any remaining low viscosity liquid from the printed layer.

Before, after, or instead of conditioning printed layer 506, carrier 524 may move printed layer 506 adjacent to curing device 532, which may be used to cure printed layer 506. Curing device 532 may be configured to solidify binding material in the ink, thereby fixing the ink into a functionally robust solid pattern. Curing device 532 may include a source of radiant energy that may interact with the binding material to cause it to become solid. In some implementations, the radiant energy can be IR radiation, UV radiation, electron beam, or other known radiation types. Alternatively or in addition, curing device 532 may include a heat source. It should be understood that the curing device 532 does not need to be limited to the disclosed radiation types, as this list is presented for exemplary implementations and not intended to be exhaustive. Curing device 532 may be positioned downstream from the conditioning device 526 and/or downstream from solvent extraction device 528 along the direction of travel.

After printed layer 506 has been gradually dried and optionally conditioned and/or cured, carrier 524 may move the printed layer 506 to a build plate 534, where transfer device 538 may be used to transfer it to build plate 534. As used herein, a "transfer device" includes any apparatus for moving a printed layer to an assembly apparatus. The first printed layer 506 may be transferred directly to build plate 534, while subsequent layers may be placed atop it to create a stack 536 of printed layers. In one implementation, the transfer device 538 includes a roller and a carrier device or drive device 546 to support and move the roller vertically. In some implementations, the carrier device 546 may be a two-axis carrier to move the roller vertically and horizontally relative to carrier 524. Vertical movement of the two-axis carrier device 546 may deflect carrier 524 and cause the printed layer 506 to make pressure contact with build plate 534 or the top of a stack of previously transferred printed layers 536. A horizontal movement of the two-axis carrier device 546 may then cause a progressively moving line moving in a predetermined direction from one end of printed layer 506 to another end of printed layer 506. The moving line contact across printed layer 506 may transfer printed layer 506 to build plate 534 or the top of a stack of previously transferred printed layers 536.

An assembly apparatus (portions of which are illustrated in FIG. 6), may include an X-Y positioner device 540 and a build station (not shown). As used herein, an "assembly apparatus" includes any system capable of receiving printed objects from a plurality of transfer modules in such a way as to assemble printed layers and printed parts according to a predetermined design. The build station may include the build plate 534. A Z axis positioner device (not shown) may be provided which may adjust the vertical position of build plate 534 to maintain the level of the top of previously transferred printed layers 536 at a predetermined vertical position to facilitate proper transfer of a printed layer 506 to build plate 534 or the top of a stack of previously transferred layers 536.

Build plate 534 may include an adhesion reducing device (not shown) to facilitate removal of the completed stack of printed objects from the build plate 534. The adhesion reducing device may be activated to reduce the adhesion of the stack of previously transferred layers 536 by an applied stimulus. The stimulus which may cause adhesion reducing device to release the stack of previously transferred layers 536, may be a thermal stimulus, a radiant stimulus, a magnetic stimulus, a chemical stimulus, an electrical stimulus or a mechanical stimulus.

In some implementations, build plate 534 may further include an alignment sensor (not shown). Printed layer 506 may include one or more alignment fiducials (not shown) which may interact with one or more alignment sensors to precisely align the printed object 506 with the build plate 534 or with the top of a stack of previously transferred printed layers 536. The alignment sensor may interact with the alignment fiducial in the UV spectrum, in the visual spectrum, in the IR spectrum, magnetically, or mechanically. In some implementations, in conjunction with a computer system, the alignment sensors may detect the position of the alignment fiducials to within 0.01 mm of actual position and cause build plate 534 to be positioned within 0.01 mm of a predetermined position relative to the alignment fiducials. Build station may interact with build plate 534 and X-Y positioner device 540 to cause build plate 534, at the command of a computer system, to be positioned to within 0.01 mm of a predetermined position relative to transfer device 538 of any one of the plurality of transfer devices comprising a multi-material multi-module printer system.

X-Y positioner device 540 may include a computer-controlled X-Y movement system. The movement system may be, but is not limited to, an orthogonally connected pair of linear actuators or a planar X-Y linear motor. Build station may be in communication with the X-Y movement system such that build station may be moved to any point within the limits of the X-Y positioner device 540. The X-Y movement system may be scaled such that assembly station may be moved to, and accurately positioned to accept a printed layer transferred from the transfer apparatus of any of the plurality of transfer devices associated with the printer system. The X-Y positioner device 540 may further be scaled to allow the assembly station to move to an unload position, clear of all printer modules associated with the printer. The clearance from associated modules may be provided in the X-Y plane or by separation orthogonal to the X-Y plane. The build station can further be provided with a rotational movement system to provide rotational alignment of build plate 534 with the transfer device 538. In another implementation, precise location of build plate 534 may be provided by a hexapod that can provide movement along the X, Y and Z axis as well as rotation about at least one axis.

Once all printed layers have been transferred to the assembly apparatus, in some implementations, the 3D printer may apply heat, radiation, pressure, or other appropriate methods to cause the stacked layers to adhere to one another to form the printed part. For example, heat may be applied at the final stage (or before the final stage) to sinter adjacent layers to one another. In other implementations, the stacked layers may adhere to one another to form the finished part without such post-processing treatment, or the part may be sintered into its final form after being removed from the assembly apparatus. By separating material deposition, post-processing and stacking, system 500 enables compaction of printed layers before they are stacked. This ensures that the printed objects have an acceptable dried solid loading (e.g., equal to or greater than 50% by volume).

In some implementations, the 3D printer system 500 includes a cleaning station 542 for cleaning the carrier 524.

The cleaning station 542 may include one or more cleaning devices for applying a cleaning agent to the surface of the carrier 542 for cleaning any residuals left from a previously printed layer (e.g., printed layer 506). For example, after the printed layer 506 has been removed from and before another layer is transferred to the carrier 524, the cleaning station 542 may apply a solvent to the surface of the carrier 524 to remove any particles or residuals remaining from the printed layer 506.

In some implementations, the 3D printer system 500 includes one or more carrier drive motors (not shown) and/or buffer stations 530 and 544 such that (under control of a print station control unit), the carrier 524 may be moved in a direction of travel, as needed. The buffer stations 530 and 544 may include a plurality of rollers 530A-530E and 544A-544C that are responsible for synchronizing the movement of carrier 524 between the different processing stations of system 500. It should be noted that while four rollers are shown for each of the buffer stations 530 and 544, the number of rollers used, as well as their location within the system 500 may change depending on the needs and configurations of the system.

In some implementations, instead of using an intermediate receiver device 504 and/or intermediate print drums 510 and 512, the printed layer may be printed directly on the carrier device. FIG. 6 depicts another example continuous 3D printing system 600. The plurality of printhead units 602A-602D used in the continuous 3D printing system 600 are staged such that the print nozzles of each one of the plurality of printheads 602A-602D form one or more substantially straight lines, and that the straight lines of the nozzles in the plurality of printhead units 602A-602D are juxtaposed parallel to each other. In an implementation, the plurality of printhead units 602A-602D may be aligned such that the parallel rows of nozzles are aligned perpendicular to the direction of travel of the carrier 524 and that the nozzles may extend substantially the full width of carrier 524. Each printhead unit 502A-502D may include one or more printheads. Moreover, each printhead unit may work independently of other printhead units and may be of printing multiple different slurries. This may result in a print layer 506 that is a combination of multiple materials in one patterned layer.

The plurality of printhead units 602A-602D may be provisioned with transport devices 604A-604D to allow the plurality of printheads 602A-602D to traverse a length or width of carrier 524 to create a predetermined pattern of inks, in voxels on carrier 524. This may be achieved by installing each of the printhead units 602A-602D on a separate transport device 604A-604D. Each of the transport devices 604A-604D may be movable individually in the vertical and/or horizontal directions such that each printhead unit may be moved in the XY plane. Having such a printhead configuration may increase the printing width and as such may cover more area than the stationary printhead configuration of system 500. As a result, the printhead configuration of system 600 may provide more flexibility and a better ability to print objects of different dimensions. It should be noted that while four printhead units 602A-602D are depicted in FIG. 6, the number of printhead units and printheads used may change depending on the needs and configurations of the system.

In some implementations, the rows of nozzles in the printhead units 602A-602D are aligned parallel to the direction of movement of the carrier 524 such that the plurality of printheads in the printhead units 602A-602D deposit a predetermined pattern of ink, in voxels, on a length of carrier 524. Whatever the configuration of printhead units 602A-602D, they may collectively deposit a layer of ink which is referred to as the printed layer 506 directly on carrier 524. To enable direct printing on, transfer of and removal from carrier 524, carrier 524 may be made from a low surface tension material. Once the print layer 506 has been printed on carrier 524, the print layer 506 may be transferred, via movement of carrier 524, to post-deposition processing stations 522, 526A-526B, 528, and 532 for post-deposition processing, before being transported to build plate 534 for assembly, as discussed in detail above in regard to FIG. 5. The post-deposition processing stations 522, 528 and 532 may enable gradual drying and solvent removal in the system 600. For example, the stations 522, 528 and/or 532 may heat the printed layer to gradually evaporate the solvent and melt the binder inside the printed layer. Melting the binder can lead to increased compaction. Furthermore, one or more of the stations 522, 528 and/or 532 may be equipped with a vacuum source to extract the solvents.

In the following, further features, characteristics and advantages of the instant application will be described via the following items:

Item 1. A three-dimensional (3D) printer, comprising:
  a receiver device;
  a plurality of material deposition units, each material deposition unit configured to deposit a material onto the receiver device, the plurality of material deposition units configured to form a printed layer on the receiver device and the material including a particulate material and a liquid vehicle;
  a material removing system, the material removal system including a plurality of extraction units for gradually removing the liquid vehicle from the printed layer; and
  a delivery system for transporting the printed layer from the receiver device to a build platform.

Item 2. The 3D printer of item 1, further comprising a plurality of curing stations for gradually curing the printed layer.

Item 3. The 3D printer of item 1 or 2, further comprising:
  a plurality of post-deposition processing stations positioned along the delivery system for performing post-deposition operations on the printed layer; and
  the build platform configured for stacking a plurality of printed layers.

Item 4. The 3D printer of item 3, wherein the plurality of post-deposition processing stations includes at least one of one or more conditioning units, one or more calendaring units and one or more curing units.

Item 5. The 3D printer of any of items 1-4, wherein the plurality of extraction units are positioned in a plurality of locations along the delivery system, each of the plurality of extraction units being configured to remove a portion of the liquid vehicle from the deposited material.

Item 6. The 3D printer of any of items 1-5, wherein the material removal system includes one or more drums configured to apply a pressure differential to extract the liquid vehicle.

Item 7. The 3D printer of item 6, wherein the one or more drums are porous drums having low surface tension.

Item 8. The 3D printer of any of items 1-7, wherein the plurality of extraction units includes an initial extraction unit and one or more additional extraction units, the plurality or extraction units having varying liquid extraction abilities.

Item 9. The 3D printer of item 8, wherein the initial extraction unit applies at least one of a heat source or a vacuum to remove the liquid vehicle.

Item 10. The 3D printer of item 8, wherein the additional extraction units apply at least one of a heat source or a vacuum to remove the liquid vehicle.

Item 11. The 3D printer of item 8, wherein at least one of the additional extraction units applies heat to the printed layer to melt a binder in the printed layer.

Item 12. The 3D printer of any of items 1-11, wherein:
the receiver device is a printing drum;
the delivery system includes one or more intermediate drums and a carrier; and
the one or more intermediate drums are configured to transfer the printed layer from the receiver device to the carrier.

Item 13. The 3D printer of item 12, wherein the one or more intermediate drums are configured to gradually remove the liquid vehicle from the printed layer by applying a pressure differential on the printed layer.

Item 14. The 3D printer of item 12, wherein the carrier is configured to transport the printed layer from the one or more intermediate drums to the build platform.

Item 15. A method of three-dimensional (3D) printing, comprising:
depositing a material onto a receiver device, via a plurality of material deposition units, to form a printed layer on the receiver device, the printed layer including a particulate material and a liquid vehicle;
gradually removing at least a portion of the liquid vehicle from the printed layer via a material removing unit comprising a plurality of extraction units; and
transferring, via a delivery system, the printed layer from the receiver device to a build platform configured for stacking a plurality of printed layers.

Item 16. The method of item 15, further comprising:
moving the printed layer through a plurality of post-deposition processing stations for post-processing the printed layer.

Item 17. The method of items 15 or 16, wherein gradually removing at least a portion of the liquid vehicle from the printed layer includes applying a pressure differential via one or more drums to the printed layer to remove at least some of the liquid vehicle.

Item 18. The method of item 17, wherein the one or more drums transfer the printed layer from the receiver device to a carrier device, the carrier device being a part of the delivery system for transferring the printed layer to the build platform.

Item 19. The method of any of items 15-18, wherein gradually removing at least a portion of the liquid vehicle from the printed layer includes applying heat to the printed layer to remove some of the liquid vehicle.

Item 20. The method of any of items 15-19, wherein gradually removing at least a portion of the liquid vehicle from the printed layer includes applying a vacuum to the printed layer to remove some of the liquid vehicle.

Item 21. The method of any of items 15-20, wherein the plurality of post-deposition processing stations includes at least one of one or more conditioning units, one or more calendaring units and one or more curing units.

Item 22. The method of any of items 15-21, wherein gradually removing at least a portion of the liquid vehicles includes using extraction units of varying solvent extraction abilities.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A three-dimensional (3D) printer, comprising:
   a receiver device;
   a plurality of material deposition units, each material deposition unit configured to deposit a material onto the receiver device, the plurality of material deposition units configured to form a printed layer on the receiver device and the material including a particulate material and a liquid vehicle;
   a material removing system that receives the printed layer from the receiver device, the material removal system including a plurality of extraction units for gradually removing the liquid vehicle from the printed layer, the plurality of extraction units including at least one extraction unit that applies back pressure to release the printed layer from the at least one extraction unit; and
   a delivery system that receives the printed layer from the material removal system and transports the printed layer to a build platform.

2. The 3D printer of claim 1, further comprising a plurality of curing stations for gradually curing the printed layer.

3. The 3D printer of claim 1, further comprising:
   a plurality of post-deposition processing stations positioned along the delivery system for performing post-deposition operations on the printed layer; and
   the build platform configured for stacking a plurality of printed layers.

4. The 3D printer of claim 3, wherein the plurality of post-deposition processing stations includes at least one of one or more conditioning units, one or more calendaring units and one or more curing units.

5. The 3D printer of claim 1, wherein the plurality of extraction units are positioned in a plurality of locations along the delivery system, each of the plurality of extraction units being configured to remove a portion of the liquid vehicle from the deposited material.

6. The 3D printer of claim 1, wherein the material removal system includes one or more drums configured to apply a pressure differential to extract the liquid vehicle.

7. The 3D printer of claim 6, wherein the one or more drums are porous drums having a surface tension that prevents sticking of the printed layer to the one or more drums.

8. The 3D printer of claim 1, wherein the plurality of extraction units includes an initial extraction unit and one or more additional extraction units, the plurality or extraction units having varying liquid extraction abilities.

9. The 3D printer of claim 8, wherein the initial extraction unit applies at least one of a heat source or a vacuum to remove the liquid vehicle.

10. The 3D printer of claim 8, wherein the one or more additional extraction units apply at least one of a heat source or a vacuum to remove the liquid vehicle.

11. The 3D printer of claim 8, wherein at least one of the additional extraction units applies heat to the printed layer to melt a binder in the printed layer.

12. The 3D printer of claim 1, wherein:
   the receiver device is a printing drum;
   the delivery system includes one or more intermediate drums and a carrier; and
   the one or more intermediate drums are configured to transfer the printed layer from the receiver device to the carrier.

13. The 3D printer of claim 12, wherein the one or more intermediate drums are configured to gradually remove the liquid vehicle from the printed layer by applying a pressure differential on the printed layer.

14. The 3D printer of claim 12, wherein the carrier is configured to transport the printed layer from the one or more intermediate drums to the build platform.

15. The 3D printer of claim 1, wherein the at least one extraction unit that applies back pressure includes a drum that applies back pressure to the printed layer to release the printed layer from the drum.

* * * * *